Dec. 6, 1927.                                          1,651,920
                         R. S. FALKINER
                    CANE HARVESTING MACHINE
                    Filed Oct. 21, 1924        4 Sheets-Sheet 1
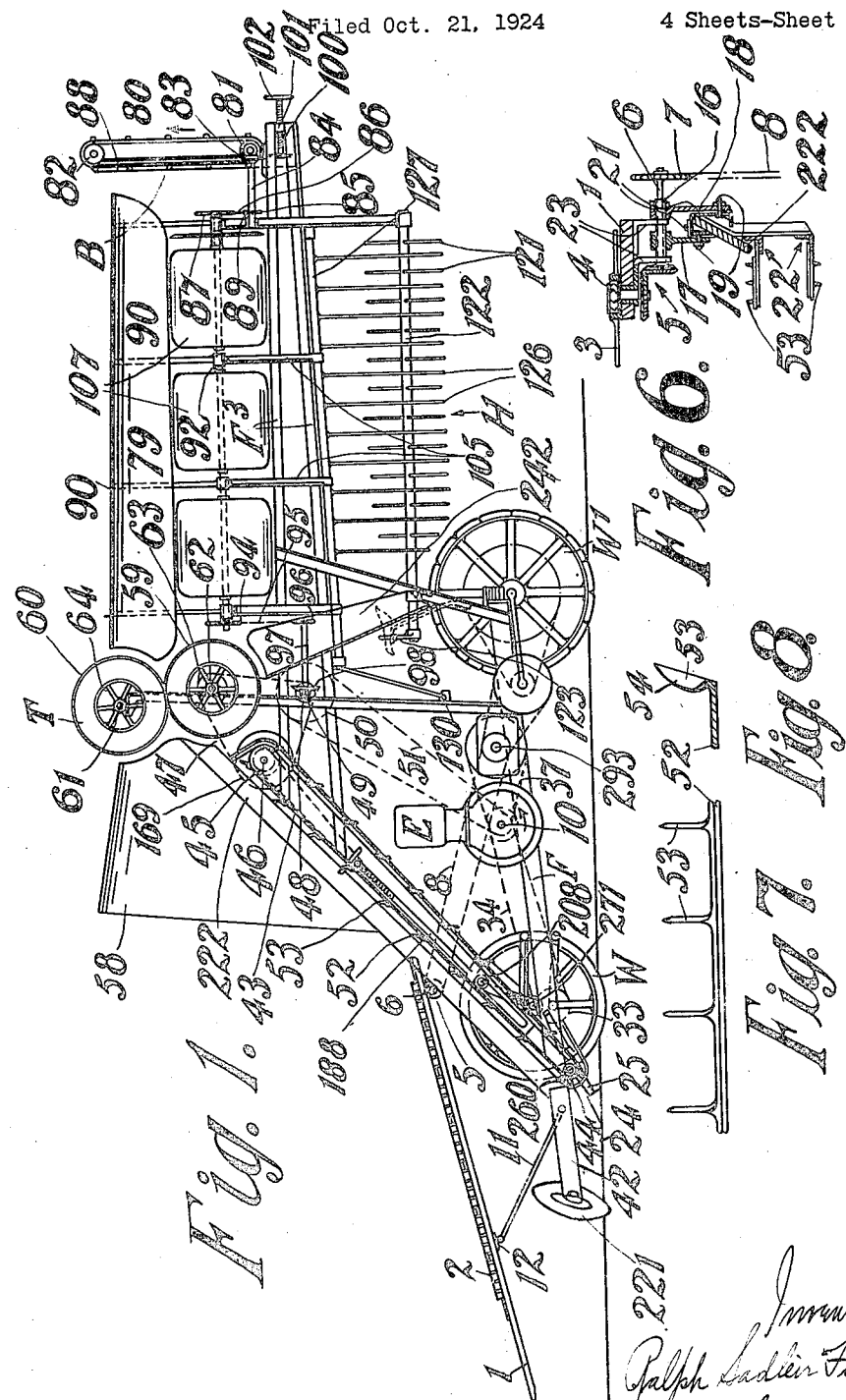
Inventor
Ralph Sadlier Falkiner
By B. Singer Atty.

Dec. 6, 1927.
R. S. FALKINER
1,651,920
CANE HARVESTING MACHINE
Filed Oct. 21, 1924 4 Sheets-Sheet 2
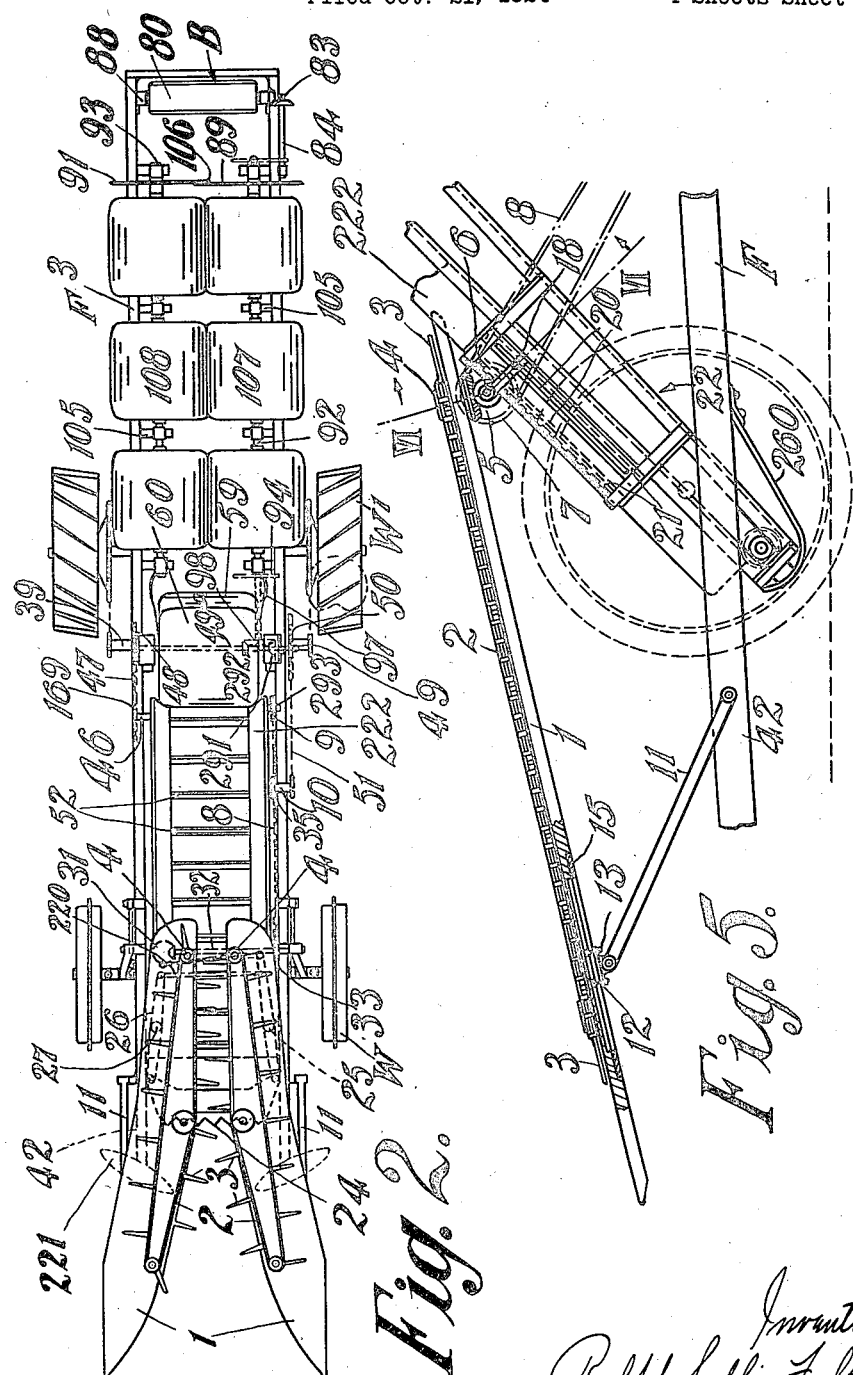

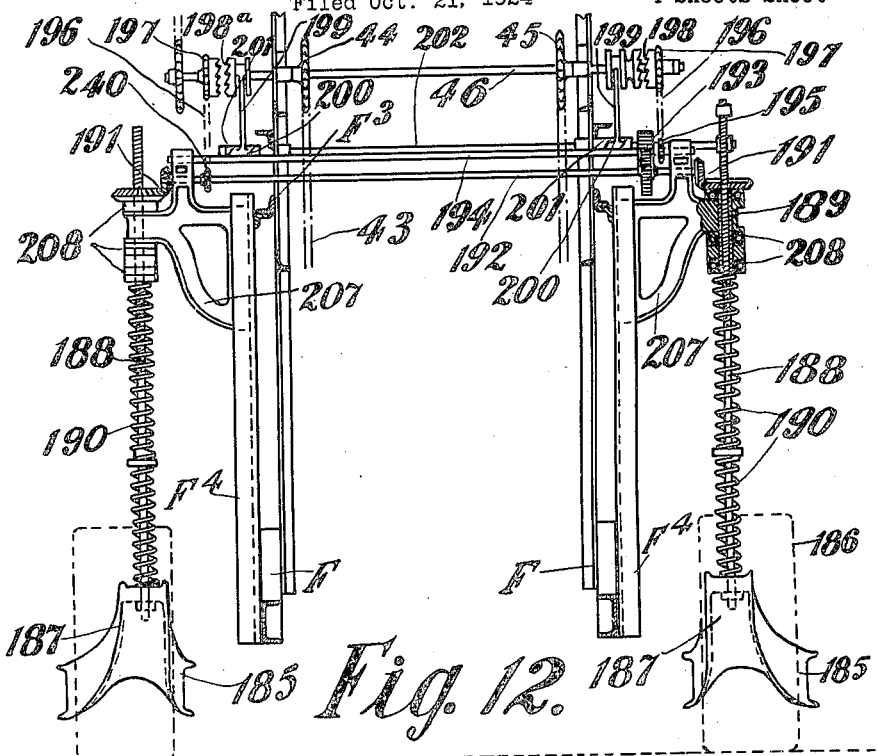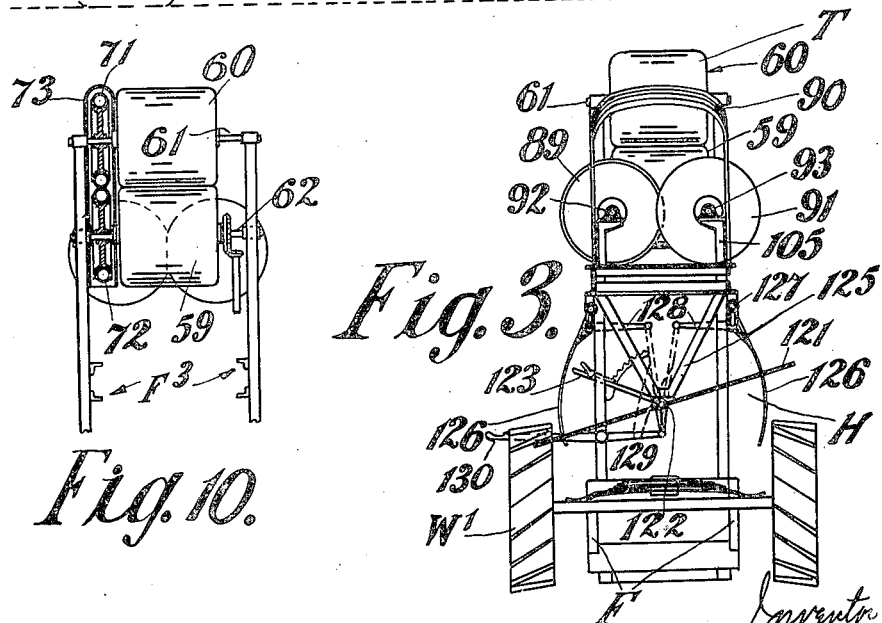

Dec. 6, 1927.
R. S. FALKINER
CANE HARVESTING MACHINE
Filed Oct. 21, 1924
1,651,920
4 Sheets-Sheet 4
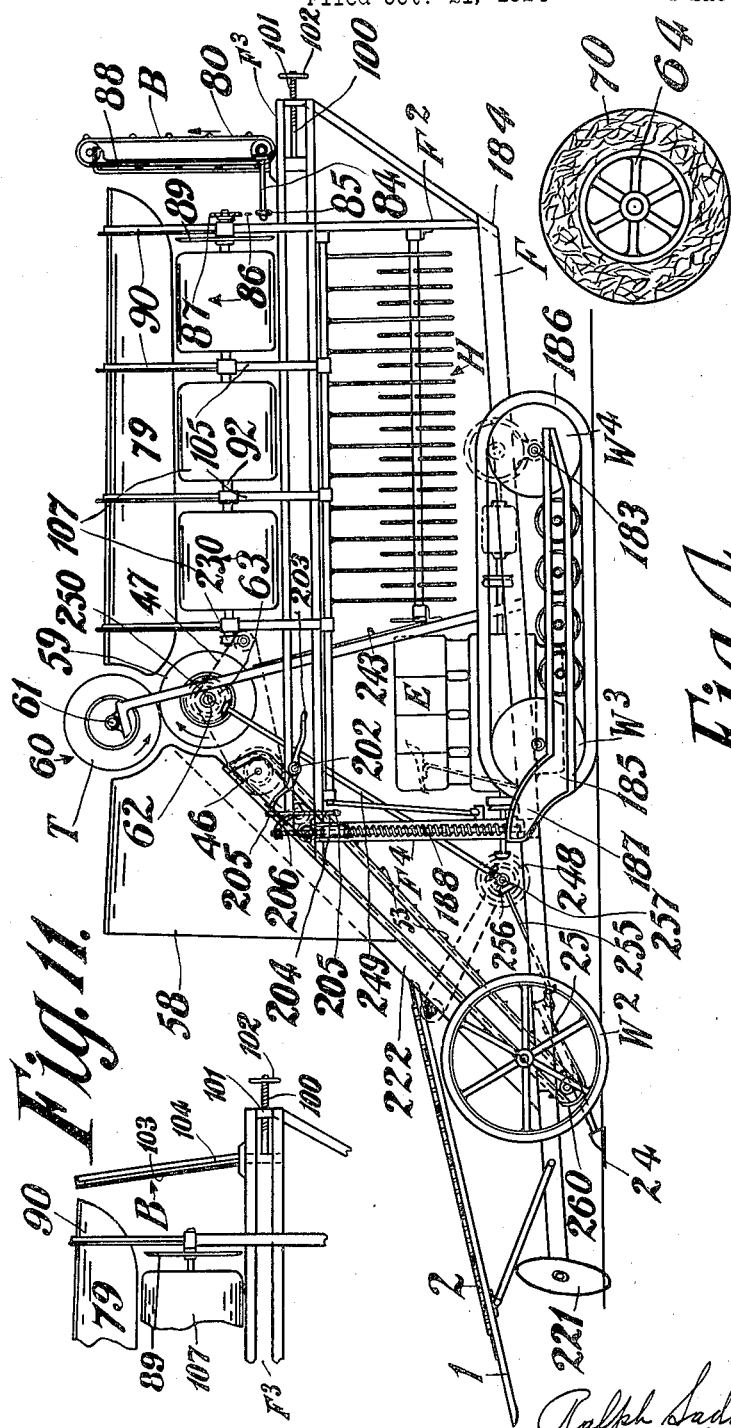

Patented Dec. 6, 1927.

1,651,920

UNITED STATES PATENT OFFICE.

RALPH SADLEIR FALKINER, OF MELBOURNE, VICTORIA, AUSTRALIA.

CANE-HARVESTING MACHINE.

Application filed October 21, 1924, Serial No. 744,988, and in Australia November 1, 1923.

This invention refers to machines used for harvesting sugar cane crops and the improvements have been devised to provide a more efficient machine than those heretofore patented or used and to simplify construction and reduce weight and length with the object of increasing the speed of the harvesting and facilitating the turning of the machine at the headland.
The essential features of the invention are pairs of rotary cane throwing rollers either pneumatic or formed with resilient peripheries for throwing the cane with the tops first at considerable speed against a hood and a stop so that they fall horizontally or approximately so upon the topping discs and upon a series of similarly constructed discharge rollers that feed the canes past said discs and deliver same into a hopper provided with discharge means.
The invention also incorporates several other improvements hereinafter described and set forth in the claims.
Practical forms of the invention are illustrated by the accompanying drawings comprising—
Figure 1 a side elevation partly in section and with parts omitted.
Figure 2 a plan with the hood removed.
Figure 3 a rear elevation with the baffle or stop omitted.
Figure 4 an elevation showing the machine mounted on endless track treads and incorporating all the novel features shown in Figures 1–3.
Figure 5 an enlarged fragmentary side elevation of part of the gathering mechanism.
Figure 6 a section on line VI—VI of Figure 5.
Figures 7 and 8 enlarged details of the elevator slats and,
Figure 9 an enlarged side view of another form of throwing rollers.
Figure 10 is a view illustrating one means of rotating the discharge rollers.
Figure 11 a detail of one form of baffle or stop.
Figure 12 an enlarged front view partly in section illustrating the raising and lowering mechanism according to Figure 4.
The machine is supported by a frame F mounted on wheels W, W¹, as in Figure 1 or upon wheels W², W³, W⁴, and endless track treads 186 as in Figure 4, the traction power being supplied by an engine E which drives all the operating parts of the machine.
The growing cane is directed to the front of the machine by gathering arms 1, Figures 1 and 2, provided with endless travelling chains 2 having fingers 3, said chains being driven by sprockets 4, bevel gear 5, Figures 5 and 6, shaft 6, sprockets 7, chain 8, sprocket 9 on shaft 293, driven by the engine E as illustrated in Figure 1.
The arms 1 are supported at their outer ends on rods 11 pivoted to forward extensions 42 on the frame F, and to permit adjustment of the angle of the arms the outer ends of each rod 11 is pivoted to a bracket 12 provided with bolts 13 passed through a slot in a plate 15 on the arm. The shaft 6 is journalled in a sleeve 16 supported in brackets 17, 18, having bolts 19 engaging slots 20 formed in angle iron bars 21 fixed to brackets on the elevator frame 22 and the sleeve 16 is pivotally supported in bearings 23 on the arm 1.
By the foregoing construction both the inner and lower ends of the arms may be raised or lowered for adjustment and secured by tightening the bolts in the slots. When the upper ends of the arms are adjusted the lengths of the chains 8 are varied by removing or adding links.
The cutter bar 40 of the cane cutting serrated knife 24 is pivoted at its ends to the outer ends of longitudinally extending levers 25, 26, Figure 2, said levers being pivoted at 27 and joined at their rear ends by a transverse link 220. Lever 25 is extended and connected to a crank driven by bevel gearing 31 and a transverse shaft 32 from said bevel gearing has a sprocket 33 driven by chain 34 and sprocket 35 on the engine shaft 10. Alternatively as in Figures 4 and 7 a longitudinal shaft 255 receives motion from bevel gear 256 deriving motion from transverse shaft 257 rotated by the engine.
Upon the forward extensions 42 of the frame F are mounted freely rotatable discs 221 set at an angle to the line of draft that cut the ground to facilitate passage of the knife and obviate obstruction to the shoes.
The cut cane falls upon the elevator which consists of chains 43, Figure 1, passing around sprockets 44, 45 the latter being mounted upon a transverse shaft 46, having a sprocket 169 driven by a chain 47 deriving motion from sprocket 48 on shaft 49 having a sprocket 50 driven by chain 51 from the engine E.

To the elevator chains are fixed slats 52 formed with narrow teeth 53, Figures 7 and 8, with their edges bent forwardly towards the elevator surface at an angle less than 90° said teeth being formed with narrow curved backs 54 so that the points of the teeth will, with surety, bite into the cane and so lift same.

The cane is guided in its upward travel by the side boards 222 and by the hood 58 covering the upper portion of the elevator. The elevator has a guard 260 to prevent the butts of the cut cane from being caught by the elevator until said cane is in an inclined position and also to protect the bottom of said elevator from stones and other obstacles on the ground.

The guard may be fixed to the frame F and curved at its lower end which is fixed to the lower end of the elevator frame.

The cane is delivered tops first between a pair of superposed rotary throwing rollers 59, 60 above the elevator and employed for throwing the cane longitudinally with their tops in advance at considerable speed against a baffle or stop B.

Preferably the cane throwing rollers are pneumatic and consist of a skeleton core 64 with an inflated tread T and arranged in close peripheral contact and the upper roller 60 is slightly in advance of the lower roller 59. The upper roller is mounted on a shaft 61 and may be frictionally rotated by the lower roller 59 on shaft 62 which has a sprocket 63, Figure 4, driven by the chain 47 and the peripheral speed of said rollers is in excess of the elevator slats.

Sufficient resiliency for the rollers may be afforded by making the complete tread or periphery of the flexible rollers of comparatively thick layer of sponge rubber 70 as in Figure 9.

In order to ensure the upper pneumatic roller positively rotating during wet weather or in the case of partial deflation the respective shafts of the rollers may be fitted at one end with pneumatic wheels 71, 72, in frictional contact and contained in a weather proof casing 73 as in Figure 10.

The canes on being thrown backwardly are directed towards the baffle or stop B by a hood 79, Figure 1, supported on bent frame members 90 behind the cane throwing rollers. This baffle or stop may consist of a plate 103, Figure 11, on a vertically disposed frame 104 mounted on a horizontal frame F³, said plate being inclined so that it is leaning towards the front of the machine to direct the tops of the cane downwardly.

As the top ends of the cane are lighter than the butt ends and will therefore not drop as readily, so the baffle or stop may consist of a vertically travelling endless apron 80 having slats and passing over rollers 81, 82 on a frame 88 the shaft of the lower roller being driven by bevel gearing 83, shaft 84 sprocket 85 chain 86 and sprocket 87.

The front portion of the apron travels downwardly and carries the tops with same so that the canes drop practically in a horizontal position.

The vertical frame 88 is slidably supported on the horizontal frame 99 and has connected therewith a screw 100 passing through a nut 101 on the end of frame F³ and provided with a hand wheel 102 whereby the baffle or stop B may be adjusted in longitudinal direction to determine the length of the cane tops to be cut off. Similarly the vertical frame 104, Figure 11, of the baffle plate or stop 103 is adjustably mounted for the same purpose.

The cane drops upon a pair of oppositely rotating cutting discs 89, 91 arranged in advance of the baffle B and mounted on longitudinal shafts 92, 93 journalled on frames 105, shaft 92 having affixed at the rear end sprocket 87 and at the front end a sprocket 94 driven by chain 95 and sprocket 96 on shaft 97 deriving motion from bevel gear 98 which gears on opposite sides with a pinion 291 on shaft 49 and a pinion 292 on shaft 49ª that imparts correct motion to chain 49 which drives the elevator and throwing rollers.

The shafts 92, 93 are parallel and sufficiently close to ensure the cutting edge of one disc slightly overlapping the other. Said edges are formed with bevels 106 which are adjacent to each other as in Figure 2, and one disc is slightly in advance of the other, which construction prevents displacement of the discs.

The canes as they drop on the topping discs also fall between pairs of pneumatic rollers 107, 108 mounted on the longitudinal shafts 92 and 93, the rollers of each pair being in frictional contact so that rollers 107 rotate rollers 108 in the opposite direction and feed or discharge the cane downwardly past the topping discs so that the severed tops drop on the ground behind the machine. If desired the rollers may have a solid rubber periphery or a thick periphery formed of sponge rubber as described and illustrated in relation to the cane throwing rollers 59 and 60 and both shafts 92 and 93 may be positively driven in opposite directions by the worm gear 230 shown in Figure 4 driven by chains 47.

The cane is preferably received in a hopper H beneath the discharge rollers 107, 108 and the load dumped when desired from said hopper to one side or the other upon the ground or upon the transport trucks for conveying the cane to the mill.

The hopper H which receives the cane as in Figures 1 and 3 may have a base consisting of a series of transverse rods 121 projecting on both sides of a longitudinal rock shaft 122 journaled on frames 125 and controlled by a spring toothed lever 123 and rack 124 so that the base may be inclined to dump the cane on one side or the other of the machine.

The sides of the hopper consist of curved rods 126 mounted on rock shafts 127 having arms 128 connected by links 129 to a foot controlled lever 130 by means of which the sides are raised to allow the cane to slide off the base of the hopper.

Fixed to the frame at the front of the hopper is a shield shown curved as at 242 in Figure 1 and flat as at 243 in Figure 4 which guards the engine and gear from falling cane.

The machine is fitted with means for raising and lowering the elevator frame and gathering mechanism and also for raising the front wheels W² when the machine is mounted on a tractor with self laying track tread 186 in Figure 4. In this latter figure the frame F is mounted on axle 183 of wheel W⁴ and extended backwardly as at 184 and provided with vertically disposed frame members F² and forwardly disposed vertical frame members F⁴ supporting the horizontal frame F³ for the topping discs, the discharging rollers and the hopper.

The frames 185 between which the tread 186 and wheels W³ and W⁴ are located meet and are turned up at their forward ends 187 and fitted with vertical rods 188, Figure 12, screw threaded at their upper ends and provided with a nut 189 between which and the ends 187 supporting springs 190 are wrapped on said rods.

The nut 189 is rotated by bevel gearing 191 from shaft 192, rotated by means of pinions 193 on shaft 194 having a sprocket 195 driven by chain 196 from sprocket 197 on the elevator shaft 46. At the opposite end of the elevator shaft the gear is the same except that the pinions 193 are not used and chain 196 passes around sprocket 240 on shaft 192.

On each end of the shaft 46 is a clutch 198, 198ᵃ controlled by arm 199 having a boss 200 with cam shaped bevelled ends located between bevelled stops 201 on a shaft 202 provided at one end with a control lever 203, Figure 4, by means of which the clutch is controlled. The frame F⁴ is provided with brackets 207, Figure 12, for the necessary bearings of the gear and carries ball bearings 208 that support the nut. Extending downwardly from the lever is a rod 204, Figure 4, with adjustable stops 205 against which may abut a finger 206 on one of the screw threaded rods 188. By means of this construction the frame carrying the front wheels W² and all the working parts of the machine can be pivotally swung on pivot 183 and when swung to raise the gathering mechanism the springs 190 aid in the movement owing to their compression when the machine is at work.

When clutch 198, Figure 12, is engaged shaft 192 is rotated in one direction by the pinions 193 and through the bevel gear 191, the nuts 189 work down rods 188 and lowers the frame while at the same time the springs 190 are compressed. Similarly when clutch 198ᵃ is engaged motion is imparted to sprocket 240 and shaft 192 rotated in the opposite direction with the result that the nuts work up the rods 188 and the frame is swung upwardly on its pivot 183.

It will be understood that as the main frame according to Figure 1, is supported on two pairs of wheels and the form shown in Figure 4 on a pair of front wheels and two pairs of wheels on an endless track and furthermore the engine in one case is transverse to the frame and in the other case longitudinally arranged the driving gear varies to a certain extent but the features of novelty are the same in both forms.

It will be noted for instance, that according to Figure 1, chain drive from the engine is employed whereas in Figure 4 bevel gearing 248, shaft 249 and bevel gearing 250 rotates the cane throwing rollers and a chain drives the elevator and the discharge rollers.

I claim:—

1. In cane harvesters, means to gather, cut and elevate the cane including an elevator and driving means therefor, in combination with a pair of superposed cane throwing rollers and means for driving said rollers at a higher rate of speed than said elevator so that said rollers throw the cane stalks which pass between them therefrom.

2. In cane harvesters, means to gather, cut and elevate the cane including an elevator and driving means therefor in combination with a pair of superposed pneumatic rotary cane throwing rollers.

3. In cane harvesters, means to gather, cut and elevate the cane including an elevator and driving means therefor, in combination with a pair of superposed cane throwing rollers and means for driving said rollers at a higher rate of speed than said elevator so that said rollers throw the cane stalks which pass between them therefrom and a stop spaced from said throwing rollers and arranged in the path of the cane thrown from said rollers and against which the cane tops impact.

4. In cane harvesters, means to gather, cut and elevate the cane including an elevator and driving means therefor in combination with a pair of superposed pneumatic rotary cane throwing rollers, and a stop spaced from said throwing rollers and arranged in the path of the cane thrown from said rollers and against which the cane tops impact.

5. In cane harvesters, means to gather, cut and elevate the cane including an elevator and driving means therefor in combination with a pair of superposed cane throwing rollers, and means for driving said rollers at a higher rate of speed than said elevator so that said rollers throw the cane stalks which pass between them therefrom, and a stop spaced from said throwing rollers and arranged in the path of the cane thrown from said rollers and against which the cane tops impact, said stop being adjustably mounted for longitudinal movement.

6. In cane harvesters, means to gather, cut and elevate the cane including an elevator and driving means therefor in combination with a pair of superposed cane throwing rollers, and means for driving said rollers at a higher rate of speed than said elevator so that said rollers throw the cane stalks which pass between them therefrom, and a stop spaced from said throwing rollers and arranged in the path of the cane thrown from said rollers and against which said cane tops impact and a hood between the rollers and said stop.

7. In cane harvesters, means to gather, cut and elevate the cane in combination with a pair of superposed pneumatic rotary cane throwing rollers, a stop consisting of an endless travelling apron with slats and a hood between the rollers and said stop.

8. In cane harvesters means to gather, cut and elevate the cane including an elevator and driving means therefor in combination with a pair of superposed cane throwing rollers and means for driving said rollers at a higher rate of speed than said elevator so that said rollers throw the cane stalks which pass between them therefrom and a stop spaced from said throwing rollers and arranged in the path of the cane thrown from said rollers and against which the cane tops impact and a hood between said rollers and said stop, and a series of pairs of rotary discharge rollers also between said cane throwing rollers and said stop and below and spaced from said hood.

9. In cane harvesters means to gather, cut and elevate the cane, and cane throwing rollers in combination with a series of pairs of pneumatic discharge rollers.

10. In cane harvesters means to gather, cut and elevate the cane in combination with a pair of superposed pneumatic cane throwing rollers, a series of pairs of rotary discharge rollers and stop at the rear of said rollers.

11. In cane harvesters, means to gather, cut and elevate the cane in combination with a pair of superposed pneumatic cane throwing rollers, a series of pairs of rotary discharge rollers, a stop at the rear of said rollers and a hood above the latter.

12. In cane harvesters, means to gather, cut and elevate the cane, in combination with a pair of superposed pneumatic cane throwing rollers, and a series of pairs of rotary pneumatic discharge rollers.

13. In cane harvesters, means to gather, cut and elevate the cane, in combination with a pair of superposed pneumatic cane throwing rollers, a series of pairs of rotary pneumatic discharge rollers, a stop at the rear of said rollers and a hood above the latter.

14. In cane harvesters, means to gather, cut and elevate the cane, a pair of superposed pneumatic cane throwing rollers, a series of pairs of rotary pneumatic discharge rollers mounted on parallel longitudinal shafts, the rollers being in frictional contact and mechanical means for rotating one shaft and a stop at the rear of said rollers.

15. In cane harvesters means to gather, cut and elevate the cane, a pair of superposed pneumatic cane throwing rollers, a series of pairs of rotary pneumatic discharge rollers mounted on parallel longitudinal shafts, the rollers being in frictional contact, mechanical means for rotating one shaft, a stop at the rear of said rollers and a hood above the latter.

16. In cane harvesters, means to gather, cut and elevate the cane, in combination with a pair of superposed cane throwing rollers, a stop in the path of the cane thrown from the rollers and against which the cane tops impact and a pair of overlapping rotary cutting discs mounted on rotary shafts between said stop and rollers.

17. In cane harvesters, means to gather, cut and elevate the cane, in combination with a pair of superposed cane throwing rollers, a stop in the path of the cane thrown from the rollers and against which the cane tops impact, a pair of overlapping rotary cutting discs between said stop and rollers, and a hood between said discs and rollers.

18. In cane harvesters, means to gather, cut and elevate the cane, in combination with a pair of superposed cane throwing rollers, a stop in the path of the cane thrown from the rollers and against which the cane tops impact, a pair of overlapping rotary cutting discs between said stop and rollers, a series of pairs of discharge rollers between said discs and throwing rollers and a hood above the discharge rollers.

19. In cane harvesters, means to gather, cut and elevate the cane, in combination with a pair of superposed cane throwing rollers, a stop in the path of the cane thrown from the rollers and against which the cane tops impact, and a pair of rotary discs mounted on parallel longitudinal shafts between said rollers and stop, said discs formed with overlapping bevel edges in contact.

20. In cane harvesters, means to gather, cut and elevate the cane, in combination with a pair of superposed cane throwing rollers, a stop in the path of the cane thrown from the rollers and a pair of topping discs, a series of pairs of discharge rollers, a hood above the latter, and a cane receiving hopper beneath said discharge rollers with means for discharging the cane.

21. In cane harvesters, means to gather, cut and elevate the cane in combination with a pair of superposed cane throwing rollers having complete flexible peripheries, a stop, a pair of topping discs, a series of pairs of discharge rollers, a hood above the latter, a cane receiving hopper consisting of a base formed of a series of transverse rods and sides of similar rods and means to tilt the base and open the sides of said hopper.

22. In cane harvesters, means to gather, cut and elevate the cane in combination with a pair of superposed cane throwing rollers having complete flexible peripheries, a stop, a pair of topping discs, a series of pairs of discharge rollers, a hood above the latter, a cane receiving hopper formed with a base comprising a series of transverse rods projecting from both sides of a rock shaft controlled by a lever and rack and the sides of said hopper formed of rods depending from rock shafts and arms projecting from said shafts and connected by rods with a control lever.

23. In cane harvesters, means to gather, and cut the cane, in combination with an elevator consisting of endless chains with slats provided with narrow teeth with their edges bent forwardly towards the elevator surface at an angle less than 90 degrees and formed with narrow sloping backs, a pair of oppositely rotating pneumatic cane throwing rollers above the elevator, a stop at the rear of said rollers and cane severing means in advance of said stop.

24. In cane harvesters having gathering chains with fingers, mounted on a pair of arms and an elevator frame having side boards from which the arms project, means to adjust the vertical height of both ends of said arms comprising rods pivoted to the main frame of the machine and provided with bolts engaging slotted plates on the outer ends of the arms, brackets about the upper ends of the arms supporting the gear of the gathering chain and provided with bolts engaging slots formed in bars fixed to the elevator frame, said brackets engaging a sleeve pivotally supported in bearings on the arm.

25. In cane harvesters, in combination cane gathering means, cane cutting means, an elevator, cane throwing rollers, a stop, cane severing and rotary discharge rollers, a pair of front wheels, a main frame supporting the foregoing parts in combination with a tractor with endless track treads, said main frame pivotally mounted on the back axle of the tractor threaded vertical rods connected with the track frame and engaged by nuts mounted on the main frame, spring supporting the latter and means to rotate said nuts in both directions to swing the main frame on its pivot.

26. In cane harvesters, in combination cane gathering means, cane cutting means, an elevator, cane throwing rollers, a stop, cane severing and rotary discharge rollers, a pair of front wheels, a main frame supporting the foregoing parts in combination with a tractor with endless track treads, said main frame pivotally mounted on the back axle of the tractor, threaded vertical rods connected with the track frame and engaged by nuts mounted on the main frame spring supporting the latter, means to rotate said nuts in both directions, a projecting finger on one threaded rod, a vertical trip rod with adjustable stops, a lever to which the trip rod is connected and a pair of clutches operated by said lever for controlling rotation of said nuts.

27. In cane harvesters, means to gather and cut the cane in combination with an elevator, a guard at the lower end thereof, rotary rollers for throwing the cane longitudinally, a stop against which the cane tops impact and means for severing the tops.

Dated this 22nd day of September, 1925.

RALPH SADLEIR FALKINER.